United States Patent
Kramer

(10) Patent No.: US 7,686,315 B2
(45) Date of Patent: Mar. 30, 2010

(54) WHEEL DRIVE MOTOR AND TRAILING ARM SUSPENSION

(75) Inventor: Dennis A. Kramer, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 580 days.

(21) Appl. No.: 11/511,825

(22) Filed: Aug. 29, 2006

(65) Prior Publication Data

US 2008/0053725 A1 Mar. 6, 2008

(51) Int. Cl.
*B60G 3/12* (2006.01)
*B60K 1/00* (2006.01)

(52) U.S. Cl. .................. 280/124.128; 280/124.153; 180/65.51; 180/65.6

(58) Field of Classification Search .......... 280/124.125, 280/124.128, 124.129, 124.156, 124.153; 180/65.6, 65.5, 65.7, 364, 369, 342, 343, 180/358, 363, 372, 377, 378, 385, 383, 65.51
See application file for complete search history.

(56) References Cited

U.S. PATENT DOCUMENTS

| | | | |
|---|---|---|---|
| 1,495,238 A | | 5/1924 | Anglada |
| 1,509,411 A | | 9/1924 | Anglada |
| 1,540,526 A | | 6/1925 | Anglada |
| 1,543,044 A | | 6/1925 | Anglada |
| 4,280,717 A | * | 7/1981 | Hanai et al. ........... 280/124.128 |
| 4,330,045 A | * | 5/1982 | Myers ....................... 180/65.5 |
| 4,695,073 A | * | 9/1987 | Pettibone et al. ....... 280/86.757 |
| 4,843,910 A | * | 7/1989 | Loeber et al. ................ 475/343 |
| 4,878,401 A | * | 11/1989 | Chung ......................... 475/153 |
| 5,472,059 A | * | 12/1995 | Schlosser et al. ........... 180/65.5 |
| 6,590,306 B2 | * | 7/2003 | Terada ....................... 310/75 C |
| 6,722,459 B1 | * | 4/2004 | Wendl et al. ................ 180/65.5 |
| 6,904,988 B2 | * | 6/2005 | Harrup et al. .............. 180/65.6 |
| 7,000,741 B2 | * | 2/2006 | Baumann et al. ........... 188/71.4 |
| 7,270,204 B2 | * | 9/2007 | Taniguchi et al. .......... 180/65.5 |
| 7,270,340 B2 | * | 9/2007 | Mosler ................... 280/93.512 |
| 2002/0117916 A1 | * | 8/2002 | Terada ....................... 310/75 C |
| 2004/0124019 A1 | * | 7/2004 | Harrup et al. .............. 180/65.1 |

OTHER PUBLICATIONS

Hayes Brake, LLC—"Mech. Brake System—Designed for Hydraulic Wheel Motors"—Specification Sheet—http://www.hayesbrake.com/NEWProduct_Popup/M30WM_Spec_Sheet.pdf.

* cited by examiner

*Primary Examiner*—Paul N Dickson
*Assistant Examiner*—Drew Brown
(74) *Attorney, Agent, or Firm*—Carlson, Gaskey & Olds

(57) ABSTRACT

A wheel drive assembly and suspension for a vehicle wheel includes a spindle, a wheel drive shaft that rotates relative to the spindle about an axis of rotation, and an electric motor that has a motor output shaft for driving the wheel drive shaft. A motor housing encloses a speed reducing planetary gear set that is driven by the motor output shaft. The motor output shaft and the wheel drive shaft are co-axial. A suspension arm extends in a direction transverse to the axis of rotation. The suspension arm includes a pivot end attached to a vehicle structure and an attachment end that is rigidly attached to the motor housing such that the electric motor is a structural part of the suspension.

26 Claims, 2 Drawing Sheets

WHEEL DRIVE MOTOR AND TRAILING ARM SUSPENSION

TECHNICAL FIELD

The subject invention relates to a wheel drive motor that comprises part of a suspension structure.

BACKGROUND OF THE INVENTION

Low floor vehicles, such as buses for example, utilize electric wheel drives with trailing arm suspensions. Each wheel includes a spindle and a wheel drive shaft that rotates relative to the spindle about a lateral axis of rotation. A traditional configuration utilizes an electric motor that has a motor output shaft that extends perpendicular to the lateral axis of rotation. A right angle, multiple gear reduction box is used to transmit driving power from the motor output shaft to the wheel drive shaft. An oil pump is also typically attached to the gear reduction box to provide sufficient lubrication.

A traditional suspension configuration utilizes a trailing arm that extends underneath the electric motor along a longitudinally extending length of the electric motor. The suspension arm includes a pivot end that is attached to a vehicle structure and an attachment end that is fixed to the gear reduction box. The electric motor is mounted to the vehicle structure with brackets.

One disadvantage with this traditional configuration is the amount of packaging space required for the electric motor, gear reduction box, oil pump, etc., which reduces space available for other components. Another disadvantage is the weight and cost of these various components.

Thus, there is a need for a more compact, reduced weight wheel drive assembly that overcomes the deficiencies in the prior art discussed above.

SUMMARY OF THE INVENTION

A suspension for an electrically driven vehicle wheel includes a spindle extending in a lateral direction, an electric motor that drives a vehicle wheel and is mounted to the spindle, and a suspension arm that extends in a longitudinal direction transverse to the lateral direction. The electric motor includes a motor housing and an output shaft that is coupled to a wheel drive shaft. The output shaft and wheel drive shaft are co-axial. The suspension arm includes a pivot end adapted for attachment to a vehicle structure and an attachment end that is rigidly attached to the motor housing such that the electric motor is a structural part of the suspension. As such, the motor housing can accommodate torsional loads resulting from forces exerted by the pivot end of the suspension arm.

In one example, the pivot end of the suspension arm includes first and second pivots that are laterally spaced apart from each other. The attachment end includes a portion that extends underneath the electric motor, and which has a first flange mount fixed to an inboard facing side of the motor housing and a second flange mount fixed to an outboard facing side of the motor housing.

In one example, the electric motor includes a planetary gear set that is driven by the output shaft. The planetary gear set includes a sun gear that is fixed for rotation with the output shaft, a plurality of planet gears in meshing engagement with the sun gear, and a stationary ring gear in meshing engagement with the plurality of planet gears. A planet carrier supports the plurality of planet gears via a corresponding plurality of planet pins. The planet carrier provides driving output to the wheel drive shaft.

In one example, the planetary gear set is associated with an outboard end of the output shaft and a parking brake is associated with an inboard end of the output shaft. The parking brake includes a rotating component that is driven by the electric motor. A non-rotating component selectively engages the rotating component to apply a parking brake force.

These and other features of the present invention can be best understood from the following specification and drawings, the following of which is a brief description.

DETAILED DESCRIPTION OF THE PREFERRED EMBODIMENT

Figure 1:
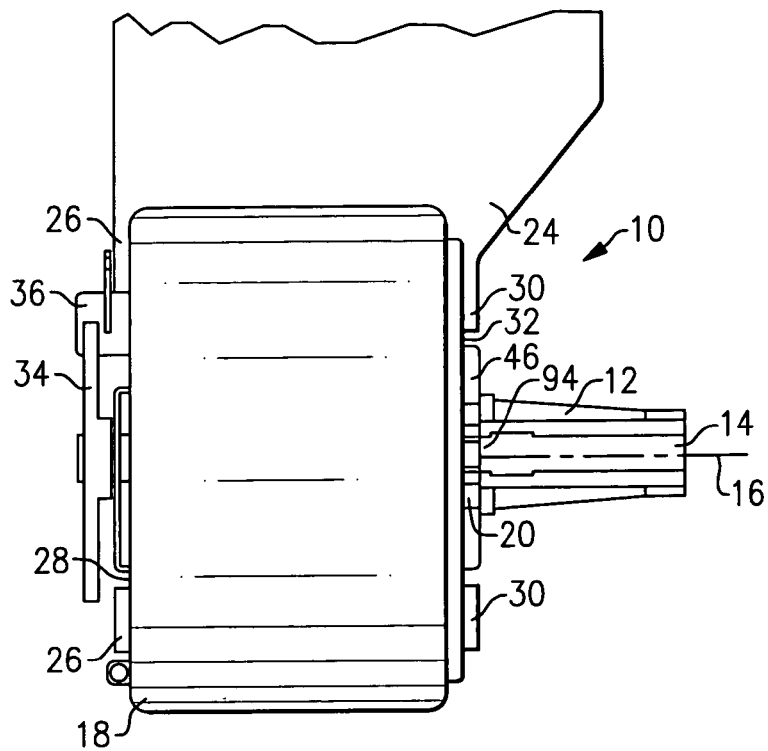
FIG. 1 is a schematic view of a wheel drive and suspension incorporating the subject invention.
Figure 2:
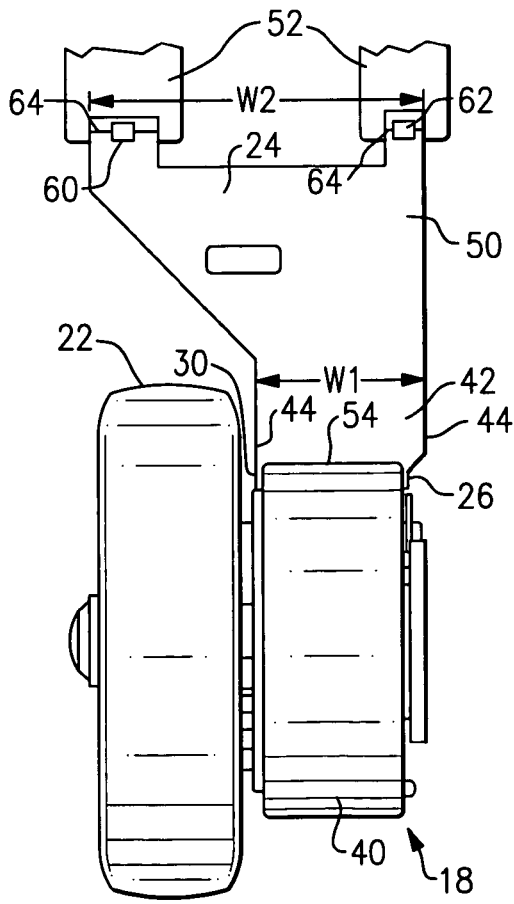
FIG. 2 is a top view of the wheel drive and suspension of FIG. 1 coupled to a wheel.

A wheel drive and suspension is shown generally at 10 in FIG. 1. The wheel drive and suspension 10 includes a spindle 12, which comprises a non-rotating component, and a wheel drive shaft 14 that rotates about a wheel axis 16 relative to the spindle 12. An electric motor 18 includes an output 20 that drives the wheel drive shaft 14. The output 20 is co-axial with the wheel axis 16. The electric motor 18 drives a vehicle wheel 22 (FIG. 2). Laterally spaced from vehicle wheel 22 is another vehicle wheel (not shown) that would similarly be driven by another electric motor as part of another wheel drive and suspension 10.

The electric motor 18 is rigidly mounted to a suspension arm 24. The suspension arm 24 is a leading or trailing type suspension arm and extends in a direction that is transverse to the wheel axis 16. The wheel axis 16 extends in a lateral direction between laterally spaced wheels. The suspension arm 24 extends rearwardly or forwardly from the electric motor 18 in a longitudinal direction. The suspension arm 24 includes a first flange mount portion 26 that is rigidly mounted to an inboard facing side 28 of the electric motor 18 and a second flange mount portion 30 that is rigidly mounted to an outboard facing side 32 of the electric motor 18. The inboard facing side 28 faces toward a vehicle center and the outboard facing side 32 faces toward the vehicle wheel 22.

Also as shown in FIG. 1, the output 20 from the electric motor 18 drives a rotating parking brake component 34. The rotating parking brake component 34 can comprise a disc, a cone, a drum, or any other type of rotating parking brake component. A non-rotating brake component 36 is selectively engaged with the rotating parking brake component 34 to apply a parking brake force as needed.

As shown in FIG. 2, the electric motor 18 includes a motor housing 40 that is mounted directly on top of the suspension arm 24. The suspension arm comprises a box-like structure and includes an arm portion 42 that extends underneath the motor housing 40. The first 26 and second 30 flange mount portions extend upwardly from opposing outer edges 44 of the arm portion 42 for rigid attachment to opposing sides of the motor housing 40 as described above. Thus, the motor housing 40 is cradled within a box-like structure formed by the arm portion 42, and the first 26 and second 30 flange mount portions. Additionally, the motor housing 40 is rigidly mounted to the spindle 12 via mounting flange 46 (FIG. 1). This suspension mounting configuration allows the motor housing 40 to form a structural part of the suspension for accommodating certain types of suspension loads. This will be discussed in greater detail below.

The suspension arm 24 includes a first end 50 that is attached to a vehicle structure 52 and a second end 54 that is attached to the motor housing 40. The first end 50 comprises a pivot attachment and the second end 54 comprises a rigid attachment via the first 26 and second 30 flange mount portions, as described above.

The arm portion 42 extends away from the motor housing 40 in a longitudinal direction toward the pivot attachment. The arm portion 42 is defined by a first width W1 at the electric motor 18 and widens out to a second width W2 at the pivot attachment. The pivot attachment comprises a first pivot 60 that is coupled to the vehicle structure 52 and a second pivot 62 that is coupled to the vehicle structure 52. Preferably, the vehicle structure comprises a frame rail having spaced apart rail flanges that mount the first 60 and second 62 pivots, however, the suspension arm could also be attached to other types of vehicle structures.

The first 60 and second 62 pivots are laterally spaced apart from each other and rotate about a common axis 64. The axis 64 is parallel to and longitudinally spaced apart from the wheel axis 16. As shown in FIG. 2 the first pivot 60 comprises an outboard pivot that is spaced from the electric motor 18 by a greater lateral distance than the second pivot 62 (inboard pivot) due to the widened portion of the suspension arm 24.

By rigidly mounting the motor housing 40 directly to the suspension arm 24, the motor housing 40 comprises a structural suspension component that accommodates torsional loads resulting from forces exerted by the pivot attachment of the suspension arm 24. These torsional loads are generated as the vehicle wheel 22 experiences loading that tries to rock or twist the vehicle wheel 22 in an inward or inboard direction.

Figure 3:
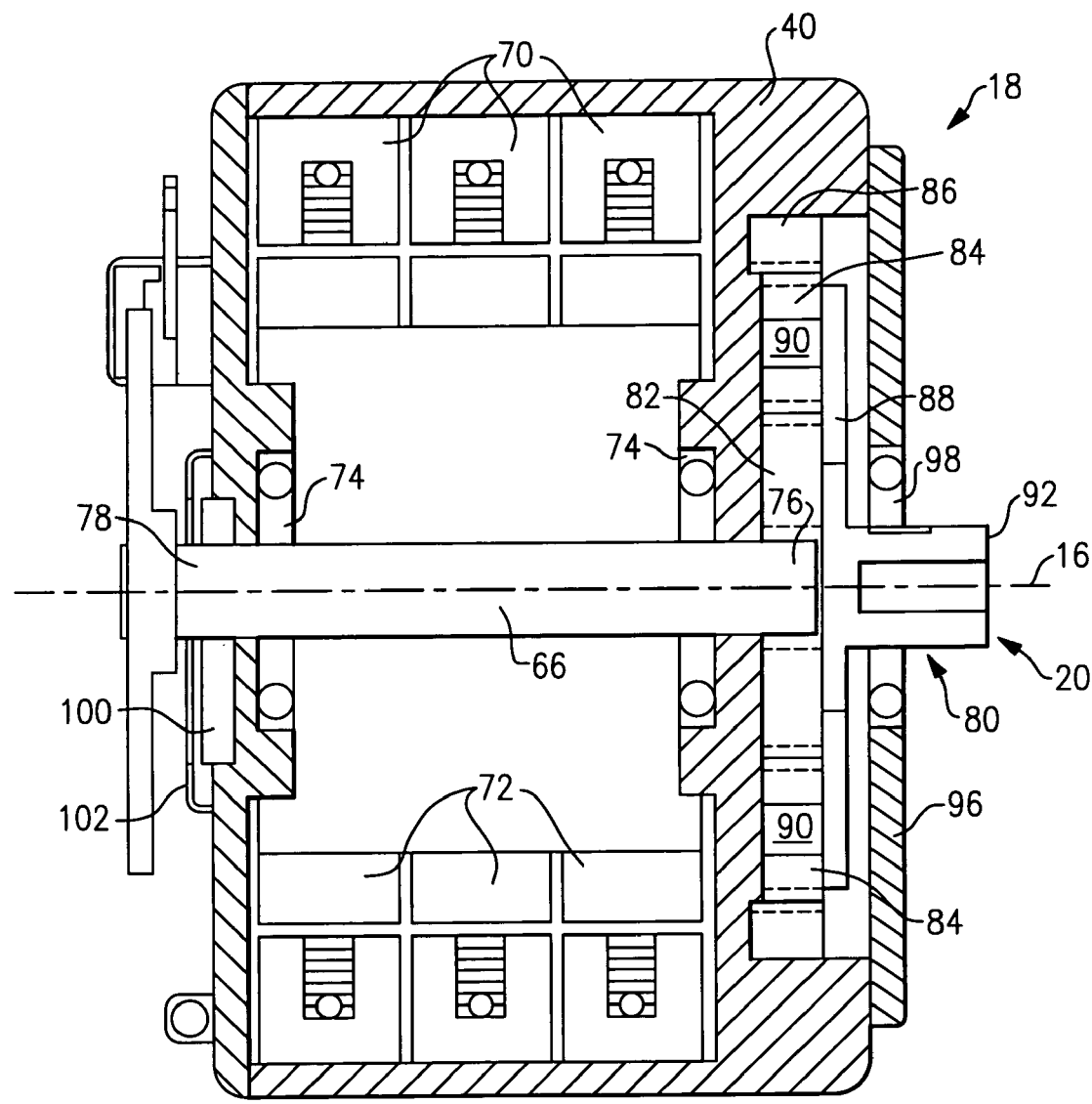
FIG. 3 is a schematic view of an internal configuration of an electric motor used in the wheel drive and suspension of FIGS. 1-2.

As shown in FIG. 3, the output 20 of the electric motor 18 comprises an output shaft 66 that is co-axial with the wheel drive shaft 14. The electric motor 18 includes stator laminations 70 that are fixed to the motor housing 40 and rotor laminations 72 that are mounted for rotation with the output shaft 66. Operation of the electric motor 18 due to interaction between the stator 70 and rotor 72 laminations is as known and will not be discussed in further detail.

The output shaft 66 is rotatably supported for rotation relative to the motor housing 40 by a pair of bearings 74. One bearing 74 is positioned at an outboard end 76 of the output shaft 66 and one bearing is positioned at an inboard end 78 of the output shaft 66.

The electric motor 18 also includes a planetary gear set 80 that that is enclosed within the motor housing 40. The planetary gear set 80 includes a sun gear 82 that is directly fixed for rotation with the output shaft 66. A plurality of planet gears 84 are in direct meshing engagement with the sun gear 82. Preferably, three or four planet gears 84, are used, however, the number of planet gears 84 could vary. Each of the planet gears 84 is in direct meshing engagement with a ring gear 86 that is fixed to the motor housing 40. The planet gears 84 are supported on a planet carrier 88 via a plurality of planet pins 90.

The output shaft 66 drives the sun gear 82, which drives the planet gears 84 about the ring gear 86, causing the planet carrier 88 to rotate. The planet carrier 88 thus provides the driving output to the wheel drive shaft 14. The planet carrier 88 includes a female connection portion 92 that is coupled to a male connection portion 94 (FIG. 1) of the wheel drive shaft 14. It should be understood that these male and female connections could also be reversed.

A cover 96 encloses the planetary gear set 80 within the motor housing 40. The female connection portion 92 is supported for rotation relative to the cover 96 via a third bearing 98.

As discussed above, the electric motor 18 also drives a rotating parking brake component 34. The rotating parking brake component 34 is fixed for rotation with the output shaft 66. Preferably, the planetary gear set 80 is supported by the outboard end 76 of the output shaft 66 and the rotating parking brake component 34 is supported by the inboard end 78 of the output shaft 66. The non-rotating brake component 36 is preferably mounted to the motor housing 40.

Electronics/sensors 100, such as an encoder, for example, are associated with the output shaft 66 for monitoring/controlling motor characteristics. The electronics/sensors 100 are enclosed by a cover 102 that is mounted to the motor housing 40.

The subject invention provides significant advantages over traditional transverse motor mount configurations. A shorter, but larger diameter, motor with a built-in single stage planetary gear drive can be used to provide a more compact and simplified mounting configuration where the motor output and wheel drive axes are co-axial. In one example, this compact configuration provides a motor that can be mounted within an envelope of 17 inches by 13 inches, which is significantly smaller than prior designs, and which is easily mounted within an envelope defined by an outer circumference of the vehicle wheel. Further, the use of the motor housing as a structural member of the suspension also provides additional benefits as described above. Thus, the subjection invention provides a significantly lower cost, reduced size, and reduced weight configuration compared to prior configurations.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A wheel drive assembly comprising:

a spindle;

a wheel shaft mounted for rotation relative to said spindle about a wheel axis;

an electric motor including a motor housing attached to said spindle and a motor output shaft coupled to drive said wheel shaft, said motor output shaft being co-axial with said wheel axis; and a suspension arm comprising one of a trailing arm and leading arm extending in a direction transverse to said wheel axis, said suspension arm having a pivot end adapted for attachment to a vehicle structure and an attachment end rigidly attached to said motor housing such that said motor housing accommodates torsional loads resulting from forces exerted by said pivot end of said suspension arm.

2. The wheel drive assembly according to claim 1 wherein said suspension arm extends in a generally longitudinal direction and wherein said pivot end of said suspension arm includes a first pivot and a second pivot spaced from said first pivot in a generally lateral direction transverse to said generally longitudinal direction.

3. The wheel drive assembly according to claim 2 wherein said first and second pivots pivot about a common axis that is longitudinally spaced from, and parallel to, said wheel axis.

4. The wheel drive assembly according to claim 2 wherein said electric motor is positioned to be laterally offset closer to one of said first and second pivots than the other of said first and second pivots.

5. The wheel drive assembly according to claim 1 wherein said electric motor includes a planetary gear set enclosed within said motor housing, said planetary gear set coupling said motor output shaft to said wheel shaft to provide speed reduction for a vehicle wheel.

6. The wheel drive assembly according to claim 5 wherein said planetary gear set includes a sun gear fixed to said motor output shaft, a plurality of planet gears in meshing engagement with said sun gear, a ring gear fixed to said motor housing and in meshing engagement with said plurality of planet gears, and a planet carrier coupled to said plurality of planet gears, said planet carrier providing driving output to said wheel shaft.

7. The wheel drive assembly according to claim 6 wherein said planet carrier includes one of a female portion and a male portion and the wheel shaft includes the other of said female and male portions, said female and male portions being coupled together to drive the vehicle wheel.

8. The wheel drive assembly according to claim 5 wherein said motor output shaft includes an inboard end and an outboard end, and wherein said planetary gear set is coupled to said outboard end.

9. The wheel drive assembly according to claim 8 including a parking brake rotating component that is driven by said inboard end of said motor output shaft, said parking brake rotating component being selectively engageable with a non-rotating component to apply a parking brake force.

10. The wheel drive assembly according to claim 1 wherein said motor housing is only attached to one suspension arm.

11. The wheel drive assembly according to claim 1 wherein said suspension arm comprises a single arm body having a box-like structure with an open top, said suspension arm extending underneath said electric motor such that said motor housing is mounted directly on top of said suspension arm.

12. The wheel drive assembly according to claim 1 wherein said suspension arm includes a longitudinally extending arm portion that extends between said attachment end and said pivot end, said longitudinally extending arm portion being defined by a variable width extending in a lateral direction, said arm portion having a significantly greater width at said pivot end than at said attachment end.

13. The wheel drive assembly according to claim 1 wherein said motor housing substantially encloses said electric motor and is separately attachable to said suspension arm at said attachment end, and wherein said spindle circumferentially surrounds said wheel shaft, is positioned externally of said motor housing, and is separately attachable to an outboard side of said motor housing at a connection interface.

14. The wheel drive assembly according to claim 1 including a single-stage planetary gear set enclosed within said motor housing, said single-stage planetary gear set comprising a sun gear driven by said motor output shaft, a plurality of planet gears in meshing engagement with said sun gear, a non-rotating ring gear in meshing engagement with said planet gears, and a planet carrier that supports said planet gears and provides driving output to said wheel shaft.

15. The wheel drive assembly according to claim 1 wherein said wheel shaft is separately coupled to an outboard end of said motor output shaft at a connection interface located outboard of said motor housing, and including a brake assembly comprising a rotating brake component directly fixed to an inboard end of said motor output shaft at a connection interface located inboard of said motor housing and a non-rotating brake component fixed to said motor housing, said non-rotating brake component selectively engaging said rotating brake component in response to a braking request.

16. A wheel drive assembly comprising:
   a spindle;
   a wheel shaft mounted for rotation relative to said spindle about a wheel axis;
   an electric motor including a motor housing attached to said spindle and a motor output shaft coupled to drive said wheel shaft, said motor output shaft being co-axial with said wheel axis;
   a single-stage planetary gear set positioned within said motor housing, said single-stage planetary gear set comprising a sun gear driven by said motor output shaft, a plurality of planet gears in meshing engagement with said sun gear, a non-rotating ring gear in meshing engagement with said planet gears, and a planer carrier that supports said planet gears and provides driving output to said wheel shaft; and
   a suspension arm extending in a direction transverse to said wheel axis, said suspension arm having a pivot end adapted for attachment to a vehicle structure and an attachment end rigidly attached to said motor housing such that said motor housing accommodates torsional loads resulting from forces exerted by said pivot end of said suspension arm, and wherein said suspension arm extends in a generally longitudinal direction with said pivot end of said suspension arm including a first pivot and a second pivot spaced from said first pivot in a generally lateral direction transverse to said generally longitudinal direction, and wherein said attachment end of said suspension arm includes a first flange mount attached to an inboard facing side of said electric motor and a second flange mount attached to an outboard facing side of said electric motor.

17. A suspension assembly for an electrically driven wheel comprising:
   a spindle extending along a lateral axis;
   an electric motor for driving a vehicle wheel, said electric motor including a motor housing directly attached to said spindle; and
   a suspension arm comprising one of a trailing arm and leading arm extending in a longitudinal direction transverse to said lateral axis, said suspension arm having a pivot end adapted for attachment to a vehicle structure and an attachment end rigidly attached to said motor housing such that said motor housing accommodates torsional loads resulting from forces exerted by said pivot end of said suspension arm.

18. The suspension assembly according to claim 17 wherein said electric motor includes an output shaft that is co-coaxial with a wheel axis of rotation.

19. The suspension assembly according to claim 18 wherein said pivot end of said suspension arm includes a first pivot and a second pivot spaced from said first pivot in a lateral direction.

20. The suspension assembly according to claim 17 wherein said motor housing is only attached to one suspension arm.

21. The suspension assembly according to claim 17 wherein said suspension arm comprises a single arm body having a box-like structure with an open top, said suspension arm extending underneath said electric motor such that said motor housing is mounted directly on top of said suspension arm.

22. The suspension assembly according to claim 21 wherein said suspension arm includes a longitudinally extending arm portion that extends between said attachment end and said pivot end, said longitudinally extending arm portion being defined by a variable width extending in a lateral direction, said arm portion having a significantly greater width at said pivot end than at said attachment end.

23. The suspension assembly according to claim 17 wherein said motor housing substantially encloses said electric motor and is separately attachable to said suspension arm at said attachment end, and wherein said spindle circumferentially surrounds a rotating wheel shaft, is positioned externally of said motor housing, and is separately attachable to an outboard side of said motor housing at a connection interface.

24. The suspension assembly according to claim 23 including a single-stage planetary gear set enclosed within said motor housing, said single-stage planetary gear set comprising a sun gear driven by a motor output shaft, a plurality of planet gears in meshing engagement with said sun gear, a non-rotating ring gear in meshing engagement with said planet gears, and a planet carrier that supports said planet gears and provides driving output to said rotating wheel shaft.

25. The suspension assembly according to claim 24 wherein said rotating wheel shaft is separately coupled to an outboard end of said motor output shaft at a connection interface located outboard of said motor housing, and including a brake assembly comprising a rotating brake component directly fixed to an inboard end of said motor output shaft at a connection interface located inboard of said motor housing and a non-rotating brake component fixed to said motor housing, said non-rotating brake component selectively engaging said rotating brake component in response to a braking request.

26. A suspension assembly for an electrically driven wheel comprising:

a spindle extending along a lateral axis;

an electric motor for driving a vehicle wheel, said electric motor including a motor housing directly attached to said spindle and an output shaft that is co-coaxial with a wheel axis of rotation;

a wheel shaft mounted for rotation relative to said spindle about a wheel axis, said wheel shaft being separately coupled to an outboard end of said output shaft at a connection interface located outboard of said motor housing;

a brake assembly including a rotating brake component directly fixed to an inboard end of said output shaft at a connection interface located inboard of said motor housing and a non-rotating brake component fixed to said motor housing, said non-rotating brake component selectively engaging said rotating brake component in response to a braking request; and a suspension arm extending in a longitudinal direction transverse to said lateral axis, said suspension arm having a pivot end adapted for attachment to a vehicle structure and an attachment end rigidly attached to said motor housing such that said motor housing accommodates torsional loads resulting from forces exerted by said pivot end of said suspension arm, and wherein said suspension arm comprises one of a trailing arm and leading arm and wherein said pivot end of said suspension arm includes a first pivot and a second pivot spaced from said first pivot in a lateral direction, and wherein said attachment end of said suspension arm includes a first flange mount directly attached to an inboard facing side of said motor housing and a second flange mount directly attached to an outboard facing side of said motor housing.

* * * * *